United States Patent
Ono

(10) Patent No.: US 9,742,945 B2
(45) Date of Patent: Aug. 22, 2017

(54) IMAGE FORMING APPARATUS TO STORE ACTIVATION APPLICATION SPECIFYING INFORMATION THAT SPECIFIES AN APPLICATION TO BE ACTIVATED ON THE OPERATING SYSTEM OF THE OPERATION UNIT IN RESPONSE TO THE IMAGE FORMING APPARATUS ENTERING A GIVEN STATE, IMAGE FORMING SYSTEM, AND IMAGE FORMING METHOD

(71) Applicant: Zentaroh Ono, Tokyo (JP)

(72) Inventor: Zentaroh Ono, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/163,868

(22) Filed: May 25, 2016

(65) Prior Publication Data

US 2016/0352948 A1 Dec. 1, 2016

(30) Foreign Application Priority Data

Jun. 1, 2015 (JP) ................................. 2015-111541

(51) Int. Cl.
*H04N 1/00* (2006.01)

(52) U.S. Cl.
CPC ..... *H04N 1/00891* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 2014/0082609 | A1 | 3/2014 | Ono |
| 2014/0176976 | A1* | 6/2014 | Tsukahara .......... G03G 15/5004 358/1.13 |
| 2014/0250444 | A1 | 9/2014 | Ono |
| 2014/0325526 | A1* | 10/2014 | Nagata ...................... G06F 8/34 719/312 |
| 2015/0278982 | A1 | 10/2015 | Ono |

FOREIGN PATENT DOCUMENTS

JP 2014-126924 7/2014

* cited by examiner

*Primary Examiner* — Andrew H Lam
(74) *Attorney, Agent, or Firm* — Harness, Dickey & Pierce, P.L.C.

(57) ABSTRACT

An image forming apparatus performs: storing activation application specifying information that specifies an application to be activated on an operating system of an operation unit when the image forming apparatus enters a given state; notifying a main unit of the activation application specifying information; storing the notified activation application specifying information; controlling activation of an application to be activated by then operation unit, which is the application specified with reference to the activation application specifying information according to a state of the image forming apparatus, performing control to cause a display unit to display a screen for accepting an operation on the activated application, and controlling activation of an application to be activated by the main unit, which is the application specified with reference to the activation application specifying information according to the state of the image forming apparatus.

18 Claims, 9 Drawing Sheets

FIG.4

| APP OF OPERATION UNIT | CORRESPONDENCE INFORMATION | APP OF MAIN UNIT |
|---|---|---|
| EASY COPY | COPY | LEGACY COPY |
| EASY SCANNER | SCAN | LEGACY SCANNER |
| EASY FAX | FAX | LEGACY FAX |
| BROWSER | - | HOME |

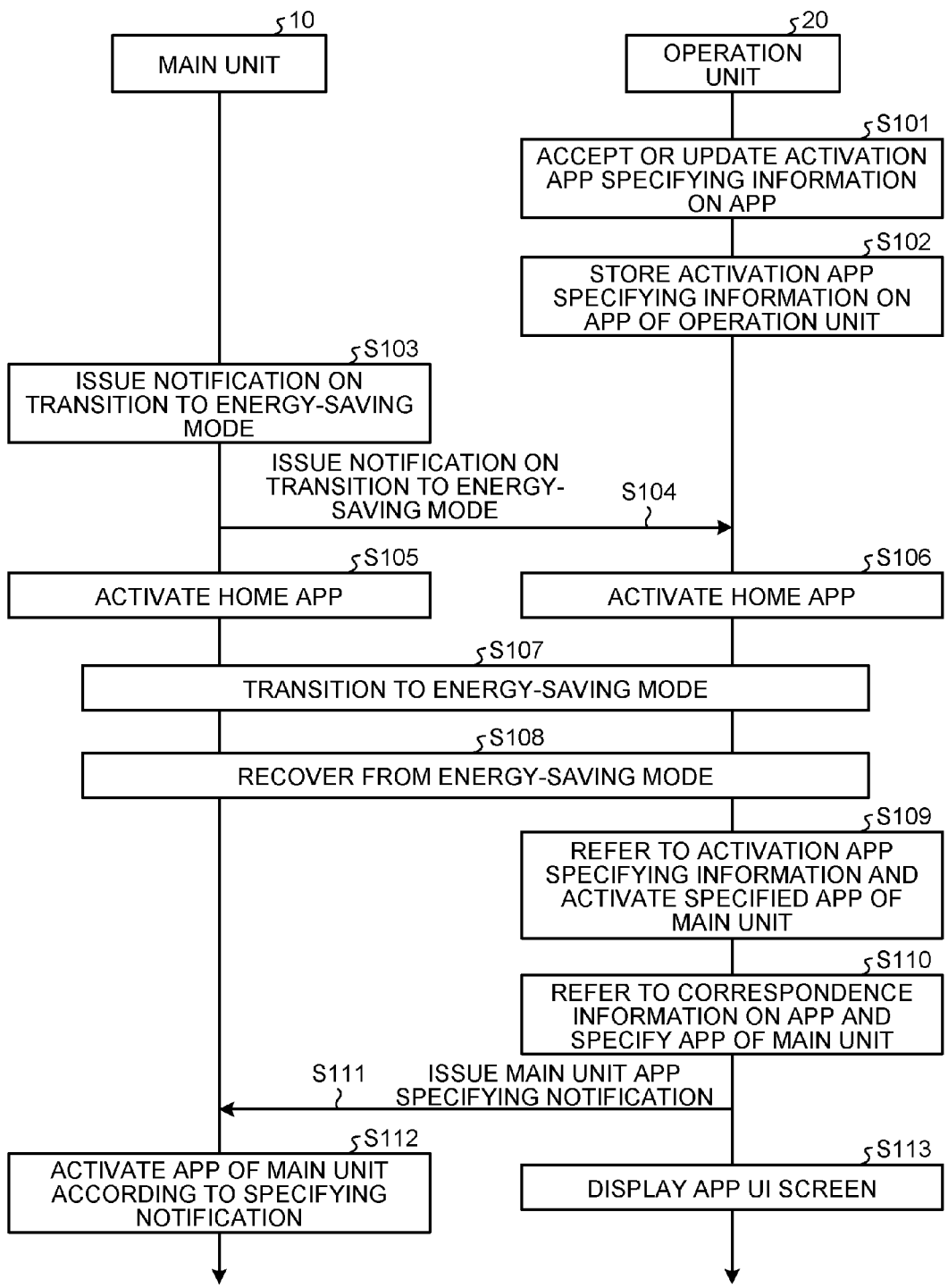

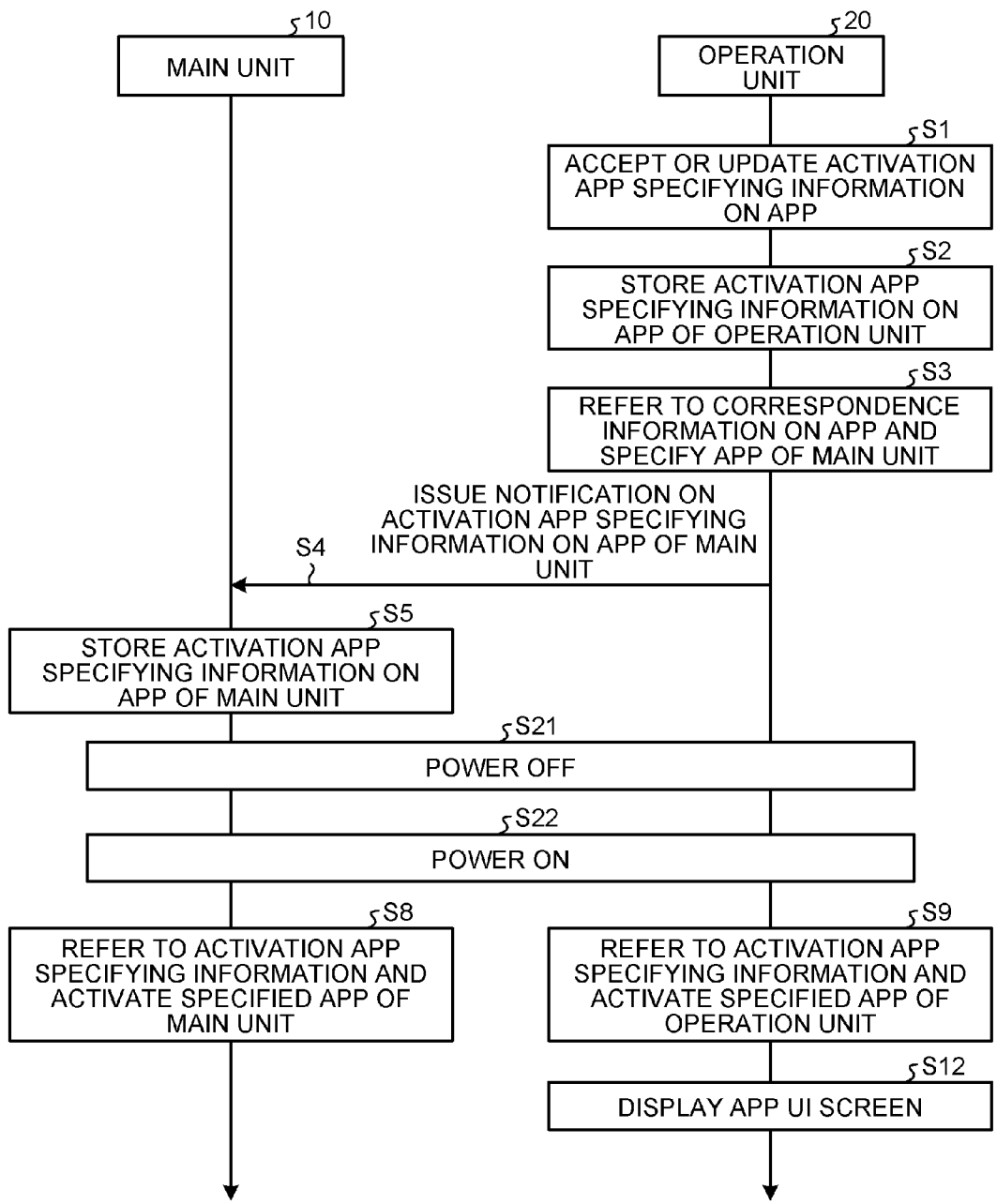

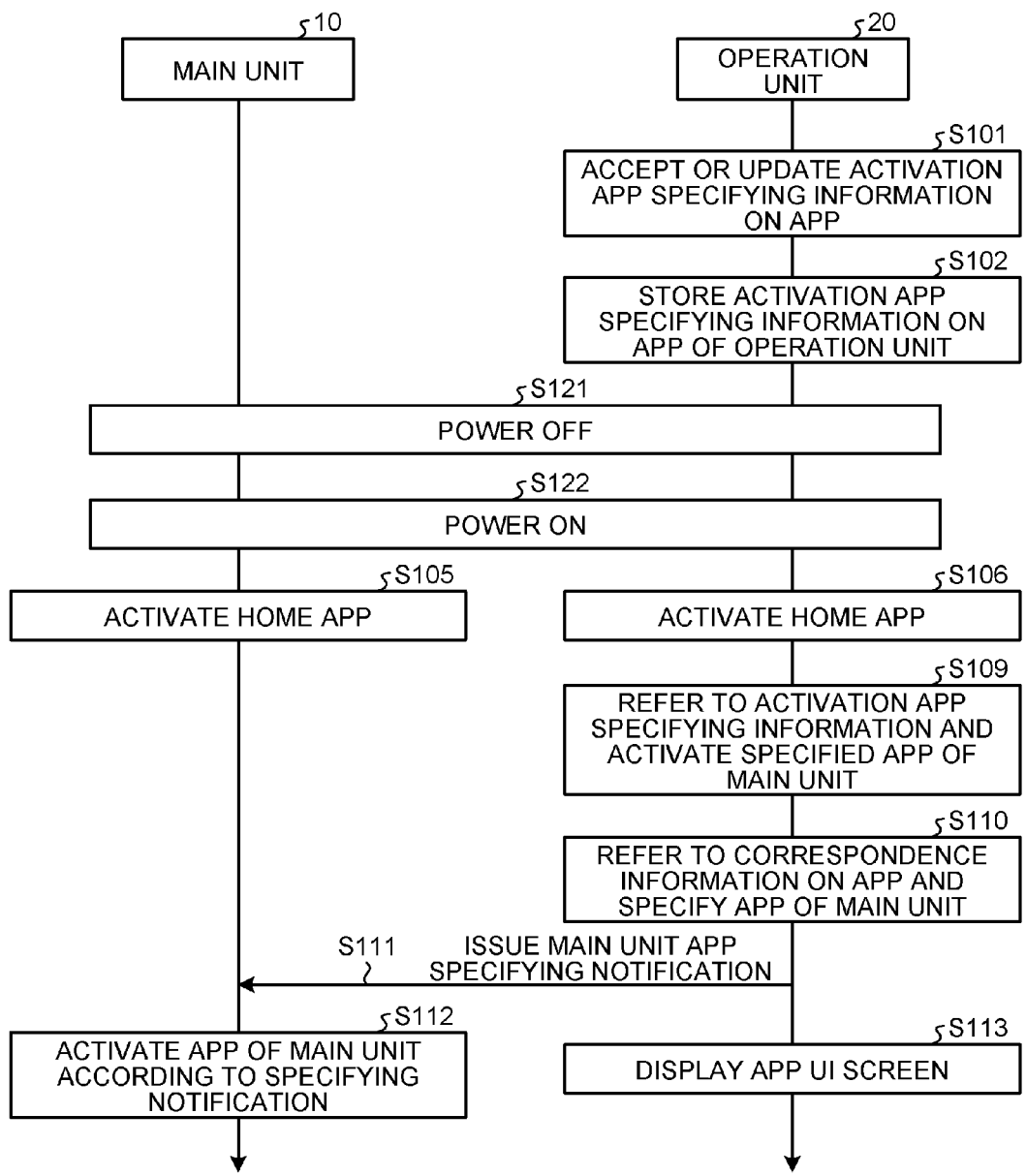

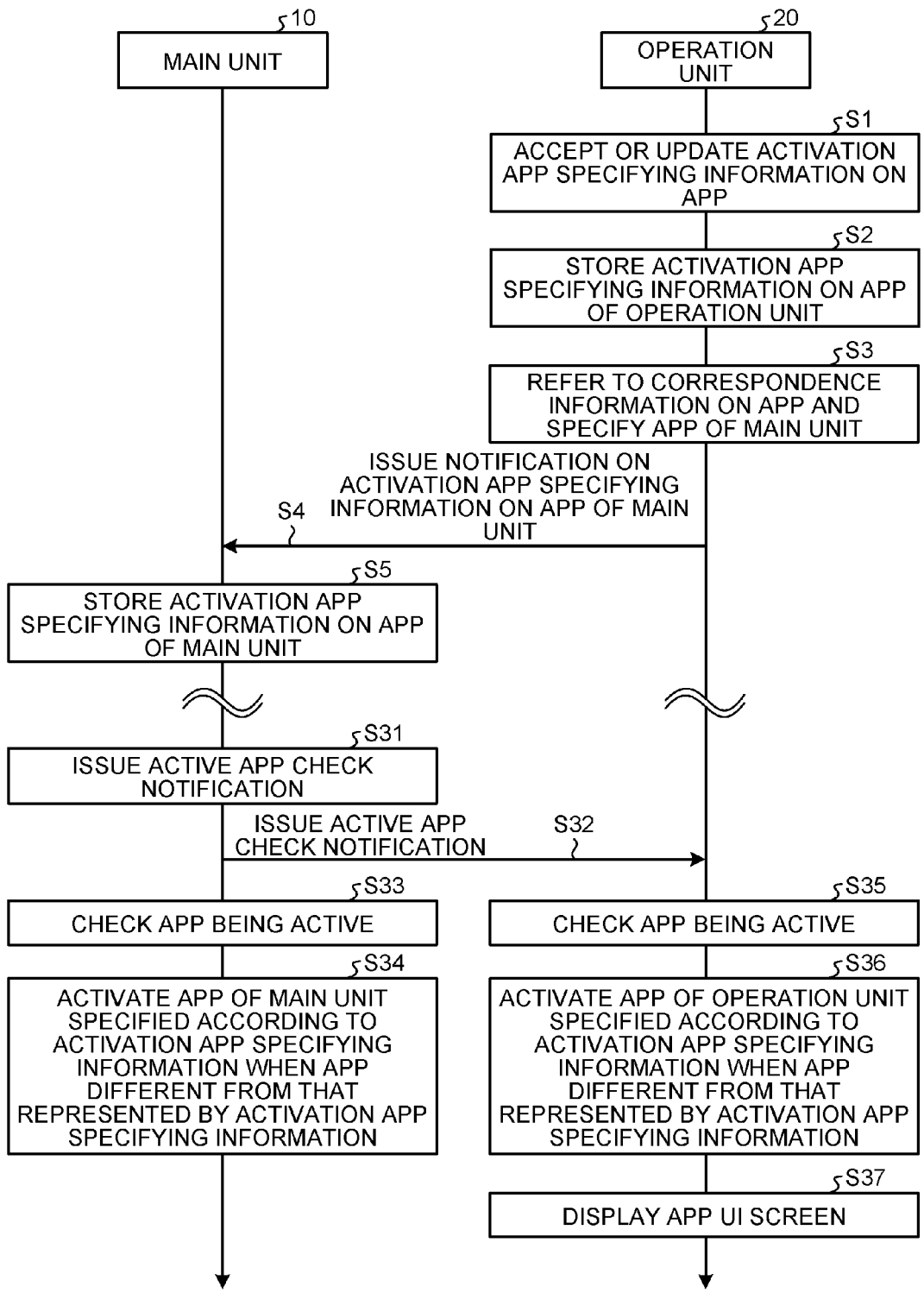

IMAGE FORMING APPARATUS TO STORE ACTIVATION APPLICATION SPECIFYING INFORMATION THAT SPECIFIES AN APPLICATION TO BE ACTIVATED ON THE OPERATING SYSTEM OF THE OPERATION UNIT IN RESPONSE TO THE IMAGE FORMING APPARATUS ENTERING A GIVEN STATE, IMAGE FORMING SYSTEM, AND IMAGE FORMING METHOD

CROSS-REFERENCE TO RELATED APPLICATION

The present application claims priority under 35 U.S.C. §119 to Japanese Patent Application No. 2015-111541, filed Jun. 1, 2015. The contents of which are incorporated herein by reference in their entirety.

BACKGROUND OF THE INVENTION

1. Field of the Invention

The present invention relates generally to an image forming apparatus, an image forming system, and an image forming method.

2. Description of the Related Art

There are current image forming apparatuses each including an operation unit with an operating system (OS) installed therein that makes it possible to add various applications to the operation unit. An application may be also referred to as an "app".

Furthermore, there are image forming apparatuses each of which automatically transitions to a predetermined preferential application, for example, when there has been no operation input for a certain period, after the image forming apparatus is activated, or after the image forming apparatus recovers from the state of energy-saving mode, which allows the user to quickly operate the preferential application. In such an image forming apparatus, a setting is made to display a screen for operating the application that is frequently used by the user as an operation screen to be displayed on the display unit preferentially after the image forming apparatus is activated or after it recovers from the energy-saving mode. The application for which a setting is made to display its corresponding operation screen on the display unit preferentially with respect to the home screen or the screens for operating other applications as described above is referred to as a preferential application.

For example, Japanese Unexamined Patent Publication No. 2014-126924 discloses an image forming apparatus capable of early displaying a screen for an application required by the user. The image forming apparatus according to Japanese Unexamined Patent Publication No. 2014-126924 shortens the time to wait until the user interface (UI) screen for an application selected on a displayed application list is displayed.

Because the OS installed in the operation unit makes it possible to set a preferential application at the main unit and also set a preferential application at the operation unit, it is necessary to perform processing for synchronizing preferential application settings between the operation unit and the main unit when the image forming apparatus transitions to an operation state different from the current running status on, for example, the recovery from the state of energy-saving mode, which results in the problem that the synchronization processing is time-consuming.

Furthermore, the image forming apparatus according to Japanese Unexamined Patent Publication No. 2014-126924 relates to the technology of activating an application that is selected by the user from an application list displayed on the display unit, not a technology of, when preferential applications different from each other are set in the operation unit and the main unit, respectively, synchronizing the preferential application settings between the operation unit and the main unit.

Furthermore, there is a problem of a risk that, because the synchronization processing is performed for many times, i.e., each time the image forming apparatus shifts to an operation state different from the current running status, a failure would occur in screen display of the operation unit on the process of synchronizing preferential applications between the operation unit and the main unit.

SUMMARY OF THE INVENTION

According to one aspect of the present invention, there is provided an image forming apparatus including: an operation unit including a display unit configured to display a screen and an accepting unit configured to accept an operation; and a main unit configured to run according to the operation accepted by the operation unit, each of the operation unit and the main unit having an operating system, wherein the operation unit includes: an activation information storage unit configured to store activation application specifying information that specifies an application to be activated on the operating system of the operation unit when the image forming apparatus enters a given state; a notification unit configured to notify the main unit of the activation application specifying information; an application control unit configured to control activation of the application to be activated by the operation unit, which is the application specified with reference to the activation application specifying information according to a state of the image forming apparatus; and a display control unit configured to perform control to cause the display unit to display a screen for accepting an operation on the application that is activated by the application control unit, and the main unit includes: a setting storage unit configured to store the notified activation application specifying information; and an activation control unit configured to control activation of an application to be activated by the main unit, which is the application specified with reference to the activation application specifying information according to the state of the image forming apparatus.

According to another aspect of the present invention, there is provided an image forming system including: an operation unit including a display unit that displays a screen and an accepting unit that accepts an operation; and a main unit that runs according to the operation accepted by the operation unit, each of the operation unit and the main unit having an operating system, wherein the image forming system further includes: an activation information storage configured to store activation application specifying information that specifies an application to be activated on the operating system of the operation unit when the image forming system enters a given state; a notification unit configured to notify the main unit of the activation application specifying information; an application control unit configured to control activation of the application to be activated by the operation unit, which is the application specified with reference to the activation application specifying information according to a state of the image forming system; and a display control unit configured to perform control to cause the display unit to display a screen for accepting an operation on the application that is activated by the application control unit, a setting storage unit configured to store the notified activation application specifying information; and an activation control unit configured to control activation of an application to be activated by the main unit, which is the application specified with reference to the activation application specifying information according to the state of the image forming system.

According to still another aspect of the present invention, there is provided an image forming method performed by an image forming apparatus including an operation unit including a display unit that displays a screen and an accepting unit that accepts an operation; and a main unit that runs according to the operation accepted by the operation unit, each of the operation unit and the main unit having an operating system, the image forming method including: storing activation application specifying information that specifies an application to be activated on the operating system of the operation unit when the image forming apparatus enters a given state; notifying the main unit of the activation application specifying information; storing the notified activation application specifying information; controlling activation of an application to be activated by the operation unit, which is the application specified with reference to the activation application specifying information according to a state of the image forming apparatus, performing control to cause the display unit to display a screen for accepting an operation on the activated application, and controlling activation of an application to be activated by the main unit, which is the application specified with reference to the activation application specifying information according to the state of the image forming apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table illustrating exemplary correspondence information and application correspondence information;

FIG. 6 is a diagram illustrating exemplary processing operations of a conventional MFP;

FIG. 7 is a diagram illustrating exemplary processing operations of the MFP according to the embodiment;

FIG. 8 is a diagram illustrating exemplary processing operations of the conventional MFP; and FIG. 9 is a diagram illustrating exemplary processing operations of the MFP according to the embodiment.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
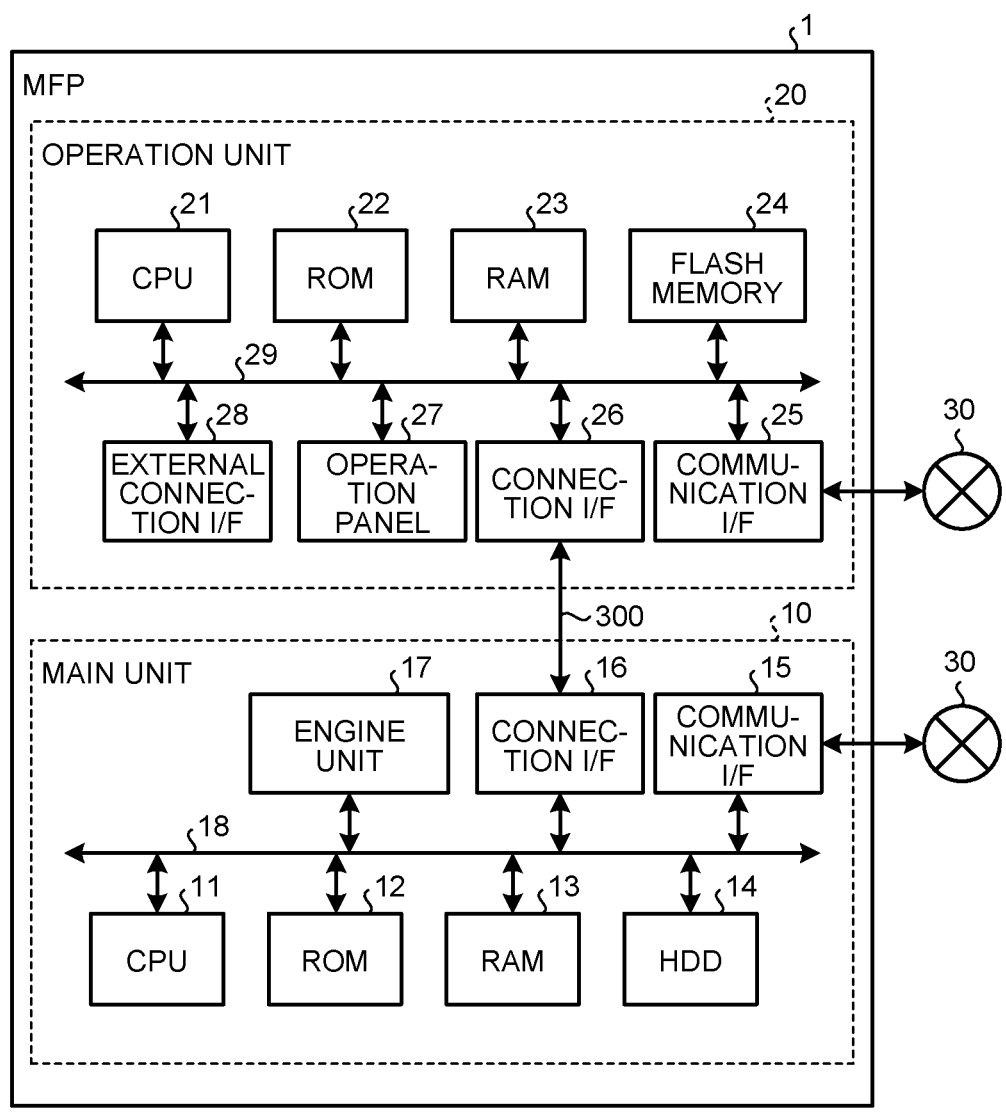
FIG. 1 is a diagram of an exemplary hardware configuration of a MFP according to an embodiment of the invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

The present invention has an object to provide an image forming apparatus, an image forming system, and an image forming method capable of efficiently performing a process of synchronization with a preferential application between an operation unit and a main unit.

With reference to the accompanying drawings, embodiments of the image forming apparatus, the image forming system, the image forming method and computer program according to the invention will be described in detail below. An exemplary case where the image forming apparatus according to the invention is applied to a multifunction peripheral (MFP) will be described; however, the invention is not limited to this. A MFP refers to an apparatus having at least two of a copy function, a scanner function, a facsimile (FAX) function, and a printer function.

FIG. 1 is a diagram of an exemplary hardware configuration of an MFP 1 according to the embodiment. As shown in FIG. 1, the MFP 1 includes a main unit 10 capable of implementing various functions including the copy function, the scanner function, the FAX function, and the printer function and an operation unit 20 that accepts inputs corresponding to user operations. The operation unit 20 includes a display unit that displays a screen and an accepting unit that accepts user operations. The main unit 10 runs according to the operations accepted by the operation unit 20. Accepting a user operation is an idea including accepting information (including a signal representing the values of coordinates on the screen) that is input according to a user operation. The main unit 10 and the operation unit 20 are communicably connected with each other via a dedicated communication path 300. For the communication path 300, for example, one according to the universal serial bus (USB) standards can be used while one according to any standards may be used regardless whether it is wired or wireless.

The main unit 10 is capable of running according to the operations accepted by the operation unit 20. The main unit 10 is communicable with an external device, such as a client personal computer (PC), and is capable running according to instructions received from an external device.

First of all, the hardware configuration of the main unit 10 will be described. As shown in FIG. 1, the main unit 10 includes a CPU 11, a ROM 12, a RAM 13, a hard disk drive (HDD), a communication interface (I/F) 15, a connection I/F 16 and an engine unit 17 that are connected with one another via a system bus 18.

The CPU 11 controls the operations of the main unit 10 entirely. The CPU 11 uses the RAM 13 as a work area and executes a program that is stored in, for example, the ROM 12 or a HDD 14 to control the entire operations of the main unit 10 and implements various functions including the copy function, the scanner function, the FAX function, and the printer function listed above.

The communication I/F 15 is an interface for connecting to a network 30. The communication I/F 15 is connected to the network 30 so as to receive printer data from an external device, such as a personal computer (PC).

The connection I/F 16 is an interface for communicating with the operation unit 20 via the communication path 300.

The engine unit 17 is hardware that performs general-purpose information processing and processing other than communications for implementing the copy function, the scanner function, the FAX function, and the printer function. For example, the engine unit 17 includes a scanner (image reading unit) that scans and reads the image on an original, a printer (image forming unit) that performs printing on a sheet material, such as paper, and a FAX unit that performs FAX communications. The engine unit 17 may further include a specific option, such as a finisher that sorts printed sheet materials or an auto document feeder (ADF) that automatically feeds originals.

The hardware configuration of the operation unit 20 will be described here. As shown in FIG. 1, the operation unit 20 includes a CPU 21, a ROM 22, a RAM 23, a flash memory 24, a communication I/F 25, a connection I/F 26, an operation panel 27, and an external connection I/F 28 that are connected with one another via a system bus 29.

The CPU 21 controls the operations of the operation unit 20 entirely. The CPU 21 uses the RAM 23 as a work area and executes a program that is stored in, for example, the ROM 22 or the flash memory 24 to control the entire operations of the operation unit 20 and implements various functions including display of information (image) according to accepted inputs from the user.

The communication I/F 25 is an interface for connecting to the network 30. The connection I/F 26 is an interface for communicating with the main unit 10 via the communication path 300.

The operation panel 27 accepts various inputs corresponding to user operations and displays various types of information (such as information corresponding to accepted inputs, information representing the running status of the MFP 1, and information representing the state of setting). In this example, the operation panel 27 consists of a liquid crystal display (LCD) with a touch panel function; however, the operation panel 27 is not limited to this. For example, the operation panel 27 may consist of an organic EL display device with the touch panel function. In addition to this, or alternatively, the operation panel 27 may be provided with an operation unit, such as hardware keys, and a display unit, such as a lamp. The operation panel 27 is not limited to this configuration. It suffices if the operation panel 27 displays an image and accepts operations corresponding to the images.

The external connection I/F 28 is an interface for connecting to peripherals, such as an IC card reader.

Figure 2:
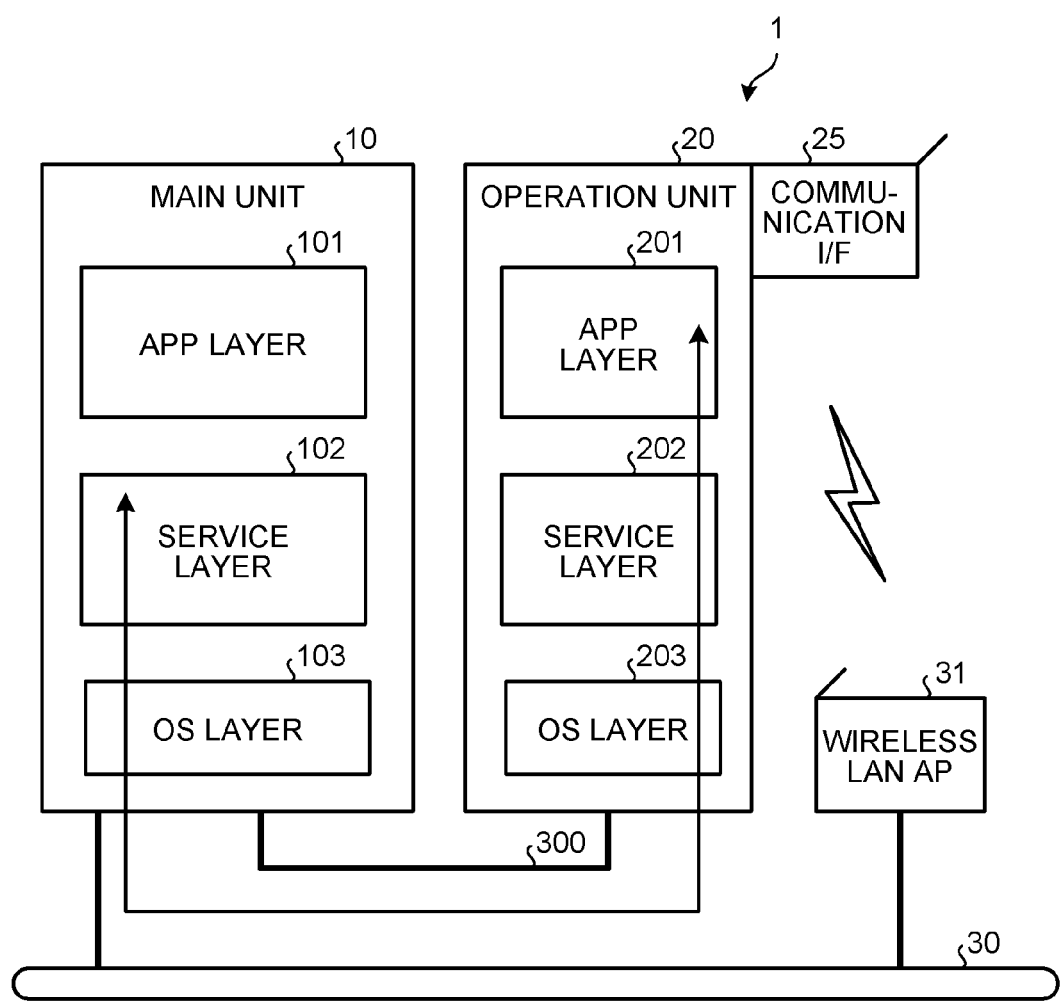
FIG. 2 is a schematic diagram of an exemplary software configuration of the MFP according to the embodiment.

The software configuration of the MFP 1 will be described here. FIG. 2 is a schematic diagram of an exemplary software configuration of an MFP. As shown in FIG. 2, the main unit 10 includes an application layer 101, a service layer 102, and an OS layer 103. The application layer 101, the service layer 102, and the OS layer 103 are substantially various types of software stored in the ROM 12 or the HDD 14. The CPU 11 executes the software to provide various functions.

The software of the application layer 101 is software for providing given functions by running the hardware resources, which is referred to as application software (which may be simply referred to as an "application" or "app"). For example, as exemplary applications, there are a copy application for providing the copy function, a scanner application for providing the scanner function, a FAX application for providing the FAX function, and a printer application for providing the printer function.

The software of the service layer 102 is software that exists between the application layer 101 and the OS layer 103 for providing an interface for using the hardware resources of the main unit 10. More specifically, it is software for providing functions of accepting requests for running the hardware resources and reconciling the running requests. For the running requests accepted by the service layer 102, for example, a request for reading by using a scanner or a request for printing by using a printer are assumed.

The interface function owing to the service layer 102 is provided to, in addition to the application layer 101 of the main unit 10, an application layer 201 of the operation unit 20. In other words, the application layer (application) 201 of the operation unit 20 enables implementation of the functions using the hardware resources (for example, the engine unit 17) of the main unit 10 via the interface function of the service layer 102.

The software of the OS layer 103 is basic software (an operating system) for providing basic functions of controlling the hardware resources of the main unit 10. The software of the service layer 102 converts requests for using the hardware resources from various applications into commands interpretable by the OS layer 103 and then passes the commands to the OS layer 103. The software of the OS layer 103 executes the commands and accordingly the hardware resources run according to the requests from the applications.

Similarly, the operation unit 20 includes the application layer 201, a service layer 202, and an OS layer 203. The application layer 201, the service layer 202, and the OS layer 203 have the same layer configurations as those of the main unit 10; however, the functions provided by the applications of the application layer 201 and the types of running requests that can be accepted by the service layer 202 are different from those of the main unit 10. The applications of the application layer 201 may be software for providing given functions by running the hardware resources of the operation unit 20; however the applications are software for mainly providing the user interface (UI) function for performing operations and display relating to the functions of the main unit 10 (the copy function, the scanner function, the FAX function and the printer function).

There are, as the applications of the application layer 201 of the operation unit 20, for example, a printer application for providing a UI function for performing operations and display relating to the printer function, a copy application for providing a UI function for performing operations and display relating to the copy function, and a FAX application for providing a UI function for performing operations and display relating to the FAX function; however, the applications are not limited to them.

According to the embodiment, in order to maintain independency between the functions, the software of the OS layer 103 of the main unit 10 and the software of the OS layer 203 of the operation unit 20 are different and independent. In other words, the main unit 10 and the operation unit 20 run on the operating systems different from each other. For example, Linux (trademark) may be used as the software of the OS layer 103 of the main unit 10 and Android (trademark) may be used as the software of the OS layer 203 of the operation unit 20. Alternatively, the main unit 10 and the operation unit 20 may use the same type of OS, for example, Android.

As described above, in the MFP 1 according to the embodiment, the main unit 10 and the operation unit 20 run on the different operating systems and accordingly the communications between the main unit 10 and the operation unit 20 are performed not as communications between processes in a common device but as communications between different devices. The communications correspond to an operation performed by the operation unit 20 to transmit the accepted information (the details of the instructions from the user) to the main unit 10 (command communication) or an operation performed by the main unit 10 to notify the operation unit 20 of events. The operation unit 20 communicates commands to the main unit 10 to use the functions of the main unit 10. Furthermore, the events of which the operation unit 20 is notified by the main unit 10 are, for example, the operation execution status in the main unit 10 and the details of the setting made at the main unit 10.

According to the embodiment, because power is supplied to the operation unit 20 from the main unit 10 via the communication path 300, the power supply to the operation unit 20 can be controlled differently from (independently of) the control on the power supply to the main unit 10.

In this example, the main unit 10 and the operation unit 20 are connected electrically and physically via the communication path 300. Alternatively, the operation unit 20 may be provided to be detachable from the main unit 10. In this case, the main unit 10 and the operation unit 20 may be provided with, for example, a short-distance radio communication unit, such as an infrared communication unit, a radio frequency (RF) communication unit, or a Bluetooth (trademark) communication unit. Alternatively, the main unit 10 and the operation unit 20 may be provided with a wireless LAN communication function, such as Wi-Fi (trademark), to be communicable with each other via a wireless LAN access point (wireless LAN AP) 31 and the network 30 as shown in FIG. 2, where LAN is the abbreviation of "local area network". When the operation unit 20 is detachable from the main unit 10, the operation unit 20 stores the power supplied from the main unit 10 via the communication path 300 in a secondary battery and, when detached from the main unit 10, uses the power stored in the secondary battery to run and communicate with the main unit 10.

Figure 3:
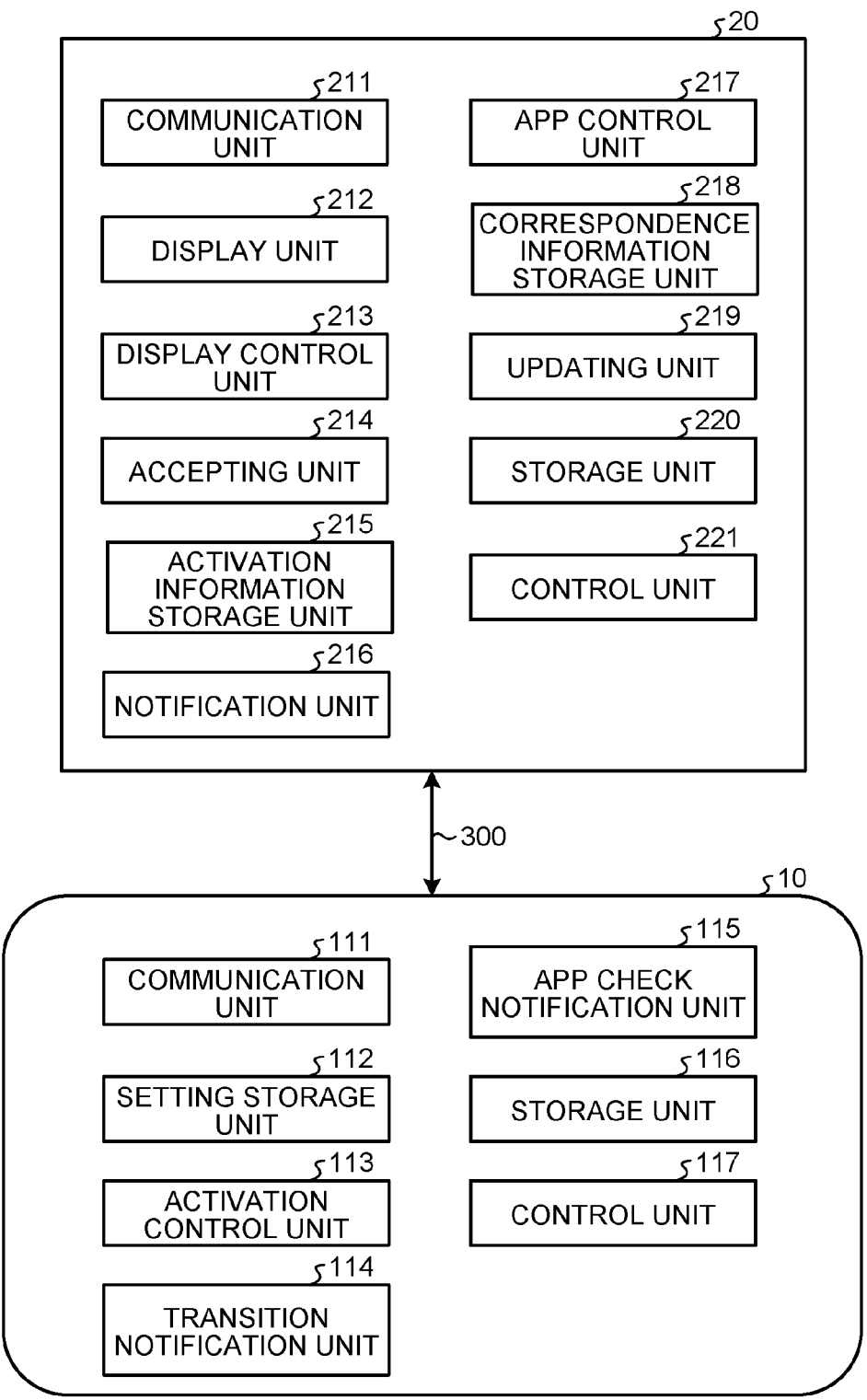
FIG. 3 is a diagram of an exemplary functional configuration of the MFP according to the embodiment.

The functional configuration of the MFP 1 according to the embodiment will be described here with reference to FIG. 3. FIG. 3 is a diagram of the exemplary functional configuration of the MFP.

First of all, the functions of the main unit 10 of the MFP 1 will be described. As shown in FIG. 3, the main unit 10 includes a communication unit 111, a setting storage unit 112, an activation control unit 113, a transition notification unit 114, an application check notification unit 115, a storage unit 116, and a control unit 117 that are the functions (modules) implemented by the CPU 11 by executing the program. Part of the units may be loaded into the RAM 13 and thus generated in the RAM 13 by the CPU 11 by reading the software (program) from the ROM 12 or the HDD 14 and executing the software. Alternatively, part or all of the units may be replaced with hardware circuits, such as processors that perform arithmetic operations.

The communication unit 111 is implemented by the CPU 11 by executing an instruction read from the ROM 12. The communication unit 111 connects with the operation unit 20 via the dedicated communication path 300 via the connection I/F 16 and transmits/receives data to/from the operation unit 20. For example, the communication unit 111 receives various operation inputs accepted by the operation unit 20 and passes them to their corresponding units. The communication unit 111 transmits data for causing the operation unit 20 to display various types of information (including information corresponding to accepted inputs, information representing the running status of the MFP 1, and information representing the state of setting).

The communication unit 111 transmits/receives data to/from an external device (such as a client PC) via the network 30 via the communication I/F 15 and passes the data to its corresponding unit. For example, the communication unit 111 receives an instruction and data for implementing a function from the external device and passes them to each corresponding unit.

The setting storage unit 112 stores activation application specifying information. For example, the setting storage unit 112 stores activation application specifying information that specifies an application of the main unit 10 corresponding to an application to be activated by the operation unit 20 that is notified by the operation unit 20. Specifically, the setting storage unit 112 receives activation application specifying information containing information specifying the application to be activated on the operating system of the main unit 10 corresponding to the application to be activated on the operating system of the operation unit 20 and stores the activation application specifying information containing the specified application to be activated on the operating system of the main unit 10. The activation application specifying information may be referred to as the "activated app specifying information"

In other words, for example, when the state of the MFP 1 transitions to a state different from the current state, more specifically, transitions to the state of energy-saving mode, the setting storage unit 112 stores an application to be activated by the main unit 10 corresponding to the preferential application of the operation unit 20. In other words, the setting storage unit 112 stores activation application specifying information that determines the preferential application of the operation unit 20 and its corresponding application to be activated by the main unit 10 that are synchronized with each other. The "application to be activated by the operation unit 20" is equivalent to the "application to be preferentially activated by the operation unit 20 (preferential application)". The energy-saving mode is a mode in which the power consumption is kept lower than that in the normal mode.

Furthermore, when a correspondence information storage unit 218 of the operation unit 20 stores or updates application correspondence information, the setting storage unit 112 accepts the activation application specifying information from the operation unit 20, updates the activation application specifying information containing the specified application to be activated by the main unit 10, and stores the updated activation application specifying information.

The activation control unit 113 is implemented by the CPU 11 by executing an instruction read from the ROM 12. The activation control unit 113 controls the process of activating the application of the main unit 10 corresponding to the preferential application of the operation unit 20. For example, the activation control unit 113 specifies the application to be activated on the operating system of the main unit 10 with reference to the activation application specifying information containing the application to be activated by the main unit 10, which is the information stored in the setting storage unit 112, and controls the activation process. Specifically, when the preferential application to be activated by the operation unit 20 according to the state of the MFP 1, for example, in a state after activation, in a state where transition to the energy-saving mode is to be performed, or a state where a predetermined period has elapsed (when system resetting is accepted) is, for example, an "easy copy" application and the activation application specifying information on the application to be activated by the main unit 10, which is the information stored in the setting storage unit 112, represents a "legacy copy" application, the activation control unit 113 performs control to activate the "legacy copy" application of the main unit 10.

Upon accepting a transition notification to transition from the normal mode to the energy-saving mode from the transition notification unit 114, which will be described below, the activation control unit 113 performs control to activate the application of the main unit 10 specified with reference to the activation application specifying information.

Upon accepting a check notification to check the application being active from the application check notification unit 115, which will be described below, the activation control unit 113 checks the application being active. When an application different from that represented by the activation application specifying information on the application to be activated by the main unit 10, which is the information stored in the setting storage unit 112, is active, the activation control unit 113 specifies the application to be activated by the main unit 10 with reference to the activation application specifying information and performs control to activate the application of the main unit 10.

In other words, as described above, when the activation application specifying information on the application to be activated by the main unit 10, which is the information stored in the setting storage unit 112, represents a "legacy copy" application and the application being active is, for example, a "legacy scanner" application, the activation control unit 113 refers to the activation application specifying information the performs control to activate the "legacy copy" application of the main unit 10.

The transition notification unit 114 is implemented by the CPU 11 by executing an instruction read from the ROM 12. The transition notification unit 114 issues the transition notification to transition from the normal mode to the energy-saving mode. The transition notification unit 114 issues the transition notification to the main unit 10 and the operation unit 20 when the non-operation time reaches a given value. The non-operation time represents the time of duration of the state where the operation panel 27 is not operated, and any value can be set for the given value. When the given value is not set, a default value is set. The transition notification unit 114 further measures the non-operation time from the last time the operation panel 27 accepted an operation. When the operation panel 27 accepts a new operation, the transition notification unit 114 accordingly resets the measurement of the non-operation time.

The application check notification unit 115 is implemented by the CPU 11 by executing an instruction read from the ROM 12. The application check notification unit 115 issues the check notification to check the application being active. For example, the application check notification unit 115 issues the check notification to the main unit 10 and the operation unit 20 each time the predetermined period elapses. The application check notification unit 115 transmits, as the check notification, for example, a control signal for performing a system resetting process to the main unit 10 and the operation unit 20. The system resetting process is, for example, a process of checking whether the applications being made active by the main unit 10 and the operation unit 20 are the application to be activated by the main unit 10 that is stored in the setting storage unit 122 and the application to be activated by the operation unit 20 (preferential application) that is stored in an activation information storage unit 215, which will be described below. Any period may be set for the predetermined period.

The storage unit 116 stores various types of data. The storage unit 116 stores, for example, various applications to be activated by the main unit 10. As the applications, for example, applications of legacy copy, legacy scanner, legacy FAX, legacy printer, and home are stored.

The storage unit 116 stores identifying information (such as the model, machine number, and ID).

The control unit 117 is implemented by the CPU 11 by executing an instruction read from the ROM 12. The control unit 117 controls the main unit 10 entirely. The control unit 117 also controls the entire processes performed by the functional units described above.

The functions of the operation unit 20 of the MFP 1 will be described here. As shown in FIG. 3, the operation unit 20 includes a communication unit 211, a display unit 212, a display control unit 213, an accepting unit 214, an activation information storage unit 215, a notification unit 216, an application control unit 217, the correspondence information storage unit 218, an updating unit 219, a storage unit 220, and a control unit 221 that are functions (modules) implemented by the CPU 21 by executing the program. Part of the units may be loaded into the RAM 23 and generated in the RAM 23 by the CPU 21 by reading the software (program) from the ROM 22 or the flash memory 24 and executing the software. Alternatively, part or all of the units may be replaced with hardware circuits, such as processors that perform arithmetic operations.

The communication unit 211 is implemented by the CPU 21 by executing an instruction read from the ROM 22. The communication unit 211 connects to the main unit 10 via the dedicated communication path 300 via the connection I/F 26 and transmits/receives data to/from the main unit 10. For example, the communication unit 211 transmits the activation application that specifies information specifying the application to be activated by the operation unit 20 (preferential application) to the main unit 10.

The communication unit 211 transmits, to the main unit 10, the activation application specifying information containing the information specifying the application to be activated by the main unit 10 corresponding to the application to be activated by the operation unit 20.

The communication unit 211 transmits, for example, various inputs accepted by the operation unit 20 to the main unit 10. For example, the communication unit 211 receives data for causing the operation unit 20 to display various types of information (such as information according to accepted inputs, information representing the running status of the MFP 1, and information representing the state of setting) and passes the data to their corresponding units.

The communication unit 211 transmits/receives data to/from an eternal device (such as a client PC) via the communication I/F and via the network 30 and passes the data to each corresponding unit. Specifically, the communication unit 211 receives instructions and data to implement the functions from the external device and passes them to each corresponding unit.

Under the control of the display control unit 213, for example, the display unit 212 displays display information for providing information to the user. The display unit 212 displays various images on the display unit 212 of the operation panel 27. Specifically, under the control of the display control unit 213, just after the MFP 1 is activated or in the state where the user does not perform any operation, for example, the display unit 212 displays a screen (user interface (UI) screen) for accepting an operation on the application activated by the application control unit 217 (preferential application), which is the application specified with reference to the activation application specifying information containing the application to be activated by the operation unit 20, which is the information stored in the activation information storage unit 215 to be described below.

Under the control of the display control unit 213, the display unit 212 displays, for example, a home screen.

The display control unit 213 is implemented by the CPU 21 by executing an instruction read from the ROM 22. The display control unit 213 performs control to cause the display unit 212 to display, for example, the display information for providing information to the user. The display control unit 213 performs control to display, for example, various images on the display unit 212 of the operation panel 27. The display control unit 213 further performs control to display the screen for accepting an operation on the application that is activated by the application control unit 217. Specifically, for example, the display control unit 213 performs control to, for example, just after the MFP 1 is activated or in the state where the user does not perform any operation, cause the display unit 212 to display, for example, the screen for accepting an operation on the application that is activated by the application control unit 217, which will be described below. In other words, the activation application specifying information stored in the activation information storage unit 215 represents, for example, the "easy copy" application, the application control unit 217 performs a process of activating the "easy copy" application and the display control unit 213 performs control to cause the display unit 212 to display the screen for accepting an operation of the "easy copy" application. In other words, when the application control unit 217 activates the "easy copy" application on the operation unit 20, the display control unit 213 performs control to cause the display unit 212 to display the screen for accepting an operation on the "easy copy" application.

Furthermore, the display control unit 213 performs control to cause the display unit 212 of the operation panel 27 to display a home screen. According to the embodiment, for example, the display control unit 213 performs control to display icons corresponding to the applications installed in the application layer 201 of the operation unit 20.

The accepting unit 214 accepts various inputs. The accepting unit 214 accepts, for example, an operation input corresponding to the operation accepting screen displayed on the display unit 212 of the operation unit 20. Specifically, the accepting unit 214 accepts an input made by a touching operation performed by the user on the screen (the surface of the display unit 212 on which an image is displayed) of the operation panel 27 with the touch panel function. In other words, in the state where the screen for accepting an operation on the application of the operation unit 20 is displayed, the accepting unit 214 accepts an icon operation input made by performing an operation of touching any one of the icons.

The activation information storage unit 215 stores the activation application specifying information that specifies the application to be activated on the operating system of the operation unit 20. When the MFP 1 enters a given state, for example, just after the MFP 1 is activated, when a state where there is not any operation input continues for a given period, or when the MFP 1 enters a state where it to transition to the energy-saving mode, the activation information storage unit 215 stores the activation application specifying information for activating the application to be activated preferentially by the application control unit 217, which will be described below. In other words, just after the MFP 1 is activated, upon accepting a control signal for performing the system resetting process described above, or when transition to the energy-saving mode is to be performed, the activation information storage unit 215 stores the preferential application to be activated by the operation unit 20.

The notification unit 216 is implemented by the CPU 21 by executing an instruction read from the ROM 22. The notification unit 216 notifies the main unit 10 of the activation application specifying information that specifies the application to be activated by the operation unit 20.

When the activation information storage unit 215 stores the activation application specifying information or the updating unit 219 updates the activation application specifying information, the notification unit 216 notifies the main unit 10 of the activation application specifying information.

With reference to the correspondence information contained in the application, the notification unit 216 notifies the main unit 10 of the activation application specifying information containing the information specifying the application to be activated by the main unit 10 corresponding to the application to be activated by the operation unit 20. The application to be activated by the operation unit 20 contains the correspondence information associating each application to be activated by the operation unit 20 with its corresponding application to be activated by the main unit 10.

The notification unit 216 refers to the application correspondence information stored in the correspondence information storage unit 218 in which each application to be activated by the operation unit 20 is associated with its corresponding application to be activated by the main unit 10 and notifies the main unit 10 of the activation application specifying information containing the information specifying the application to be activated by the main unit 10 corresponding to the application to be activated by the operation unit 20.

The correspondence information and the application correspondence information will be described here with reference to FIG. 4. FIG. 4 is a table illustrating exemplary correspondence information and application correspondence information.

As shown in FIG. 4, the application to be activated by the operation unit 20 contains the correspondence information associating each application to be activated by the operation unit 20 with its corresponding application to be activated by the main unit 10. Specifically, for the application "easy copy" of the operation unit 20, the correspondence information "copy" representing that the copy function of the main unit 10 is to be used is described in the xml in the application. If the correspondence information "copy" (xml) is described when the xml in the application is referred to, it is determined that it is information specifying the application "legacy copy" of the main unit 10. When the application to be activated by the operation unit 20 is "easy copy", the notification unit 216 notifies the main unit 10 of the application specifying information that specifies the application "legacy copy" to be activated by the main unit 10. According to the specifying of the application "legacy copy" contained in the notified activation application specifying information, the main unit 10 stores, in the setting storage unit 112, setting of the application "legacy copy" of the main unit 10 corresponding to the application "easy copy" of the operation unit 20.

Similarly, for the application "easy scanner" of the operation unit 20, the correspondence information (xml) "scan" representing that the scanner function of the main unit 10 is to be used is described in the xml of the application. If the correspondence information (xml) "scan" is described when the xml in the application is referred to, it can be determined that it is information specifying the application "legacy scanner" of the main unit 10. When the application to be activated by the operation unit 20 is "easy scanner", the notification unit 216 notifies the main unit 10 of the application specifying information that specifies the application "legacy scanner" to be activated by the main unit 10. According to the specifying of the application "legacy scanner" contained in the notified activation application specifying information, the main unit 10 stores, in the setting storage unit 112, the setting of the application "legacy scanner" of the main unit 10 corresponding to the application "easy scanner" of the operation unit 20.

For the application "easy FAX" of the operation unit 20, the correspondence information "Fax" representing that the FAX function of the main unit 10 is to be used is described in the xml of the application. If the correspondence information "FAX" (xml) is described when the xml in the application is referred to, it can be determined that it is the information specifying the application "legacy FAX" of the main unit 10. When the application to be activated by the operation unit 20 is "easy FAX", the notification unit 216 notifies the main unit 10 of the activation application specifying information that specifies the application "legacy FAX" to be activated by the main unit 10. According to the specifying of the application "legacy FAX" contained in the notified activation application specifying information, the main unit 10 stores the setting of the application "legacy FAX" of the main unit 10 corresponding to the application "easy FAX" of the operation unit 20 in the setting storage unit 112.

Because, for the application "browser" of the operation unit 20, no function of the main unit 10 used, the correspondence information is not described in xml in the application. Because the correspondence information (xml) is not described in the xml in the application, it can be determined that it is information specifying the application "home" of the main unit 10. Then, when the application to be activated by the operation unit 20 is "browser", the notification unit 216 notifies the main unit 10 of the activation application specifying information that specifies the application "home" to be activated by the main unit 10. According to the specifying of the application "home" contained in the notified activation application specifying information, the main unit 10 stores the setting of the application "home" of the main unit 10 corresponding to the application "browser" of the operation unit 20 in the setting storage unit 112.

As described above, when the application (preferential application) to be activated by the operation unit 20 is stored (set), the notification unit 216 refers to the correspondence information (xml) in the application and notifies the main unit 10 of the activation application specifying information that specifies the application to be activated by the main unit 10. In other words, the application (program) to be activated by the operation unit 20 is for executing the process for using the function and thus the information specifying the information on the application to be used by the main unit 10 is described in the xml. By referring to the correspondence information (xml) in the application to be activated by the operation unit 20, the notification unit 216 is able to issue a notification representing the activation application specifying information that specifies the application of the main unit 10.

According to the embodiment, the correspondence table, like that shown in FIG. 4, in which each application to be activated by the operation unit 20 is associated with its corresponding application to be activated by the main unit 10 can be stored as the application correspondence information in advance. Accordingly, by, not referring (analyzing) the correspondence information (xml) in the application, but by directly referring to the application correspondence information, shown in FIG. 4, associating each application to be activated by the operation unit 20 and its corresponding application to be activated by the main unit 10, the notification unit 216 is able to issue a notification representing the activation application specifying information containing the information specifying the application to be activated by the main unit 10. In other words, according to the example shown in FIG. 4, a notification is issued in which, for the application "easy copy" of the operation unit 20, the application "legacy copy" of the main unit 10 is specified; for the application "easy scanner" of the operation unit 20, the application "legacy scanner" of the main unit 10 is specified; for the application "easy FAX" of the operation unit 20, the application "legacy FAX" of the main unit 10 is specified; and for the application "browser" of the operation unit 20, the application "home" of the main unit 10 is specified.

FIG. 3 will be referred back to continue the descriptions. The application control unit 217 is implemented by the CPU 21 by executing an instruction read from the ROM 22. The application control unit 217 controls the process of activating the preferential application of the operation unit 20. For example, the application control unit 217 controls the process of activating the application (preferential application) to be activated by the operation unit 20, which is the application specified with reference to the activation application specifying information on the application to be activated on the operating system of the operation unit 20, which is the information stored in the activation information storage unit 215 according to the state of the image forming apparatus. Specifically, for example, when the activation application specifying information that specifies the application (preferential application) to be preferentially activated by the operation unit 20 in a state after activation, in a state where transition to the energy-saving mode is to be performed, or a state where a predetermined period has elapsed (when system resetting is accepted) is, for example, the "easy copy" application, the application control unit 217 performs control to activate the "easy copy" application.

Upon accepting the transition notification to transition from the normal mode to the energy-saving mode from the transition notification unit 114, the application control unit 217 refers to the activation application specifying information on the application to be started by the operation unit 20 and performs control to activate the specified application (preferential application of the operation unit 20.

Upon accepting a check notification to check the application being active from the application check notification unit 115 of the main unit 10, the application control unit 217 checks the application being active and, when an application different from that represented by the activation application specifying information on the application to be activated by the operation unit 20, which is the information stored in the activation information storage unit 215, is activated, the application control unit 217 refers to the activation application specifying information, specifies the application to be activated by the operation unit 20, and then performs control to activate the application of the operation unit 20.

In other words, as described above, the activation application specifying information on the application (preferential application) to be activated by the operation unit 20 that is stored in the activation information storage unit 215 is, for example, the "easy copy" application and the application being active is, for example, "easy scanner", the application control unit 217 performs control to activate the "easy copy" application of the operation unit 20.

The correspondence information storage unit 218 stores application correspondence information that associates each application to be activated by the operation unit 20 with its corresponding application to be activated by the main unit 10. The application correspondence information is as described with reference to FIG. 4.

The updating unit 219 is implemented by the CPU 21 by executing an instruction read from the ROM 22. The updating unit 219 updates the above-described application correspondence information when an application to be activated by the operation unit 20 is added or the application to be activated by the operation unit 20 is updated.

The storage unit 220 stores various types of data. The storage unit 220 stores, for example, various applications to be activated by the operation unit 20. For example, the applications of easy copy, easy scanner, easy FAX, printer, and home are stored as the applications.

The storage unit 220 further stores, for example, identifying information that identifies the operation unit 20. For example, the model of the operation unit, the machine number of the operation unit 20, and the ID of the operation unit 20 may be exemplified as the identifying information that identifies the operation unit 20; however, it suffices if the information can identify the operation unit 20 and any identifying information may be set.

The control unit 221 is implemented by the CPU 21 by executing an instruction read from the ROM 22. The control unit 221 controls the operation unit 20 entirely. The control unit 117 also controls the entire processes performed by the functional units described above.

Figure 5:
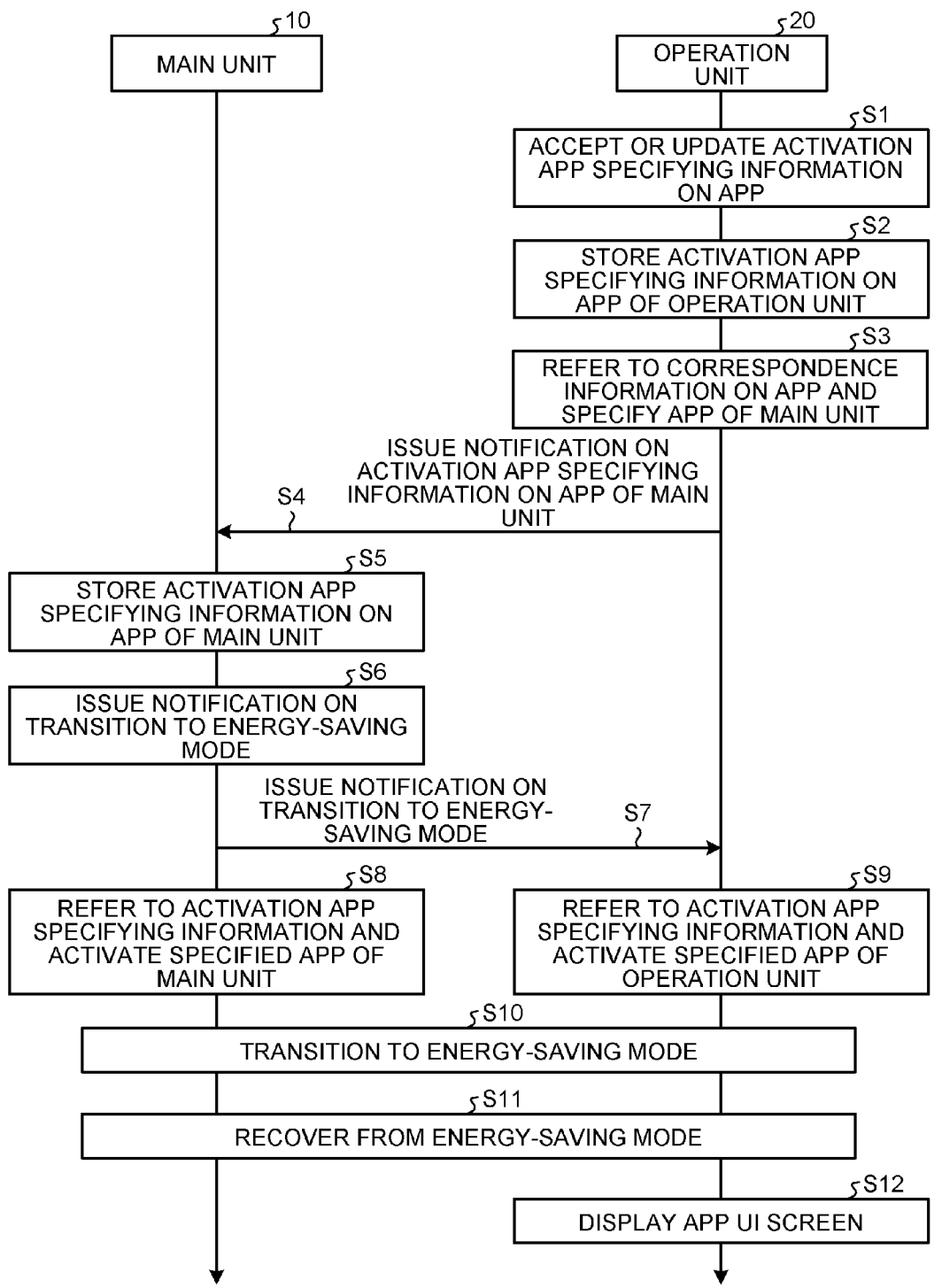
FIG. 5 is a diagram illustrating exemplary processing operations of the MFP according to the embodiment.

With reference to FIGS. 5 to 9, the processing operations performed by the MFP 1 according to the embodiment and conventional processing operations will be described. FIG. 5 is a diagram illustrating exemplary processing operations of the MFP according to the embodiment. Specifically, FIG. 5 illustrates exemplary processing operations performed, after the operation state of the MFP 1 transitions from the normal mode to the energy-saving mode, to recover from the energy-saving mode.

First of all, the accepting unit 214 of the operation unit 20 accepts the activation application specifying information for activating an application (preferential application) to be activated by the operation unit 20. Alternatively, the accepting unit 214 accepts an update of the activation application specifying information (step S1).

The activation information storage unit 215 stores the activation application specifying information that specifies the application to be activated by the operation unit 20, which is the information accepted by the accepting unit 214 (step S2).

The notification unit 216 refers to the correspondence information containing in the application and specifies the application to be activated by the main unit 10 corresponding to the application to be activated by the operation unit 20 (step S3) and then notifies the main unit 10 of the activation application specifying information containing the information specifying the application (step S4).

The setting storage unit 112 of the main unit 10 stores the activation application specifying information containing the information specifying the application to be activated by the main unit 10 corresponding to the application to be activated by the operation unit 20, which is the information notified by the notification unit 216 of the operation unit 20 (step S5).

The transition notification unit 114 of the main unit 10 issues, to the main unit 10 and the operation unit 20, the transition notification to transition from the normal mode to the energy-saving mode (step S6 and step S7).

The activation control unit 113 of the main unit 10 then performs the process of activating the application of the main unit 10 that is specified with reference to the activation application specifying information on the application to be activated by the main unit 10, which is the information stored in the setting storage unit 112 (step S8). The application control unit 217 of the operation unit 20 performs the process of activating the application (preferential application) of the operation unit 20 that is specified with reference to the activation application specifying information on the application to be activated by the operation unit 20, which is the information stored in the activation information storage unit 215 (step S9). In other words, owing to the processing at steps S8 and S9, synchronization of applications between the main unit 10 and the operation unit 20 is performed assuredly.

The main unit 10 and the operation unit 20 then transition to the energy-saving mode (step S10).

When, for example, the accepting unit 214 accepts an operation made by the user, the main unit 10 and the operation unit 20 recover from the energy-saving mode (step S11). The main unit 10 activates the application of the main unit 10 corresponding to the preferential application of the operation unit 20 that is synchronized at step S8 and the operation unit 20 activates the preferential application synchronized at step S9 and recovers to the normal mode. In other words, they recover to the normal mode in the state where the preferential application of the operation unit 20 and the application of the main unit 10 corresponding to the preferential application are synchronized with each other.

The display control unit 213 of the operation unit 20 causes the display unit 212 to display the screen (UI screen) for accepting an operation on the application that is activated at step S9 (step S12).

As described above, according to the embodiment, when the application (preferential application) to be preferentially activated by the operation unit 20 is stored, the main unit 10 is notified of the activation application specifying information that specifies the application of the main unit 10 corresponding to the preferential application. The main unit 10 stores the specified application contained in the notified activation application specifying information. This makes it is possible to efficiently perform the process of synchronizing the application (preferential application) to be preferentially activated by the operation unit 20 with the application to be activated by the main unit 10.

FIG. 6 is a diagram illustrating exemplary processing operations performed by a conventional MFP corresponding to FIG. 5.

First of all, the accepting unit 214 of the operation unit 20 accepts activation application specifying information for activating an application to be activated by the operation unit 20. Alternatively, the accepting unit 214 accepts an update of the activation application specifying information (step S101).

The activation information storage unit 215 stores the activation application specifying information that specifies the application to be activated by the operation unit 20, which is the information accepted by the accepting unit 214 (step S102).

The transition notification unit 114 of the main unit 10 then issues, to the main unit 10 and the operation unit 20, transition notification to transition from the normal mode to the energy-saving mode (steps S103 and step S104).

The activation control unit 113 of the main unit 10 then performs the process of activating the home application (step S105). The application control unit 217 of the operation unit 20 then performs a process of activating the home application (step S106). In other words, owing to the processing at steps S105 and S106, the applications of the main unit 10 and the operation unit 20 are synchronized with each other.

The main unit 10 and the operation unit 20 transition to the energy-saving mode (step S107).

When the accepting unit 214 accepts an operation made by the user, the main unit 10 and the operation unit 20 then recover from the energy-saving mode (step S108). The main unit 10 and the operation unit 20 recover to the normal mode by using the home application that is activated at steps S105 and S106. In other words, the main unit 10 and the operation unit 20 recover to the normal mode in the state where the applications of the main unit 10 and the operation unit 20 are synchronized with each other.

The application control unit 217 of the operation unit 20 refers to the activation application specifying information on the application to be activated by the operation unit 20, which is the information stored in the activation information storage unit 215, specifies the application to be activated by the operation unit 20, and performs the process of activating the application of the operation unit 20 (step S109). In other words, activation of an application to be activated preferentially by the operation unit 20 (preferential application) is performed again.

The notification unit 216 then refers to the correspondence information contained in the application and specifies the application to be activated by the main unit 10 corresponding to the application to be activated by the operation unit 20 (step S110) and then notifies the main unit 10 of the activation application specifying information containing the information that specifies the application (step S111). In other words, it is the process for synchronizing again applications between the operation unit 20 and the main unit 10.

The activation control unit 113 of the main unit 10 then performs the process of activating the application of the main unit 10 according to the application specifying notification representing the activation application specifying information that is issued by the notification unit 216 (step S112). In short, the applications of the operation unit 20 and the main unit 10 are synchronized again.

The display control unit 213 of the operation unit 20 causes the display unit 212 to display the screen (UI screen) for accepting an operation on the application that is activated at step S109 (step S113).

As described above, the conventional MFP has to, to transition to the energy-saving mode, perform the synchronization process (activates the home application) for synchronizing applications between the main unit 10 and the operation unit 20, and has to, when recovering to the normal mode, activate the application (preferential application) to be preferentially activated by the operation unit 20 and perform again the process of synchronization with the application to be activated by the main unit 10 corresponding to the preferential application.

On the other hand, the MFP 1 according to the embodiment stores the activation application specifying information on the application to be preferentially activated by the operation unit 20, which is the information accepted by the accepting unit 214 of the operation unit 20, and specifies the application to be activated by the main unit 10 corresponding to the application to be activated by the operation unit 20 and then notifies the main unit 10 of the activation application specifying information containing the information specifying the application to store the activation application specifying information in the main unit 10, whereby the process of synchronizing the application (preferential application) to be preferentially activated by the operation unit 20 with the application to be activated by the main unit 10 can be performed at a time. Thus, according to the embodiment, the process of synchronization of the preferential application between the operation unit 20 and the main unit 10 can be performed efficiently.

FIG. 7 is a diagram illustrating exemplary processing operations of the MFP according to the embodiment. Specifically, FIG. 7 illustrates exemplary processing operations performed when the operation state of the MFP 1 is at when power is shut down (power off) and when power is supplied (power on). Note that the same processing operations as those of the MFP 1 described above with reference to FIG. 5 are denoted with the same reference numbers and descriptions of processing operations overlapping those in FIG. 5 will be omitted properly.

First of all, the processing at steps S1 to S5 will be performed. Then, power to the main unit 10 and the operation unit 20 is shut down (power off) (step S21).

Then, power is supplied to the main unit 10 and the operation unit 20 (power on) (step S22). The main unit 10 refers to the activation application specifying information stored in the setting storage unit 112 at step S5, specifies the application to be activated by the main unit 10, and then performs the process of activating the application of the main unit 10 (step S8).

The operation unit 20 refers to the activation application specifying information stored in the activation information storage unit 215 at step S2, specifies the application to be activated by the operation unit 20, and then performs the process of activating the application of the operation unit 20 (step S9). In other words, because, owing to the processing at steps S2 and S5, the activation application specifying information determining the preferential application of the operation unit 20 and the application of the main unit 10 corresponding to the preferential application of the operation unit 20 that are synchronized with each other is stored, the applications in the state of already being synchronized with each other are activated at steps S8 and S9.

The display control unit 213 of the operation unit 20 causes the display unit 212 to display the screen (UI screen) for accepting an operation on the application activated at step S11 (step S12).

As described above, according to the embodiment, the application (preferential application) to be preferentially activated by the operation unit 20 is stored and the specified application containing in the activation application specifying information of which the main unit 10 is notified by the operation unit 20 is stored. Accordingly, the process of synchronizing the application (preferential application) to be preferentially activated by the operation unit 20 and the application to be activated by the main unit 10 completes. Thus, according to the embodiment, when power is supplied after power is shut down, the main unit 10 and the operation unit 20 perform the process of activating the applications according to the activation application specifying information on the already synchronized applications, which makes it possible to efficiently perform the process of synchronizing the application (preferential application) to be preferentially activated by the operation unit 20 and the application to be activated by the main unit 10.

FIG. 8 is a diagram illustrating exemplary processing operations of the conventional MFP corresponding to those in FIG. 7. Note that the same processing operations as those of the MFP described above with reference to FIG. 6 are denoted with the same reference numbers and descriptions of processing operations overlapping those in FIG. 6 will be omitted properly.

First of all, the processing at steps S101 and S102 is performed. Then, power to the main unit 10 and the operation unit 20 is shut down (power off) (step S121). Power is then supplied to the main unit 10 and the operation unit 20 (power on) (step S122).

The activation control unit 113 of the main unit 10 performs the process of activating the home application (step S105). The application control unit 217 of the operation unit 20 performs the process of activating the home application (step S106). In short, owing to the processing at step S105 and step S106, the applications of the main unit 10 and the operation unit 20 are synchronized with each other.

The main unit 10 and the operation unit 20 then perform the processing at steps S109 to S113.

As described above, when power is supplied (power on) after power is shut down (power off), the conventional MFP has to activate the application (preferential application) to be preferentially activated by the operation unit 20 after performing the synchronization process for synchronization of applications between the main unit 10 and the operation unit 20 (activating the home application) and has to perform again the process of synchronization with the application to be activated by the main unit 10 corresponding to the preferential application.

On the other hand, the MFP 1 according to the embodiment stores the application (preferential) application to be preferentially activated by the operation unit 20 and stores the specified application contained in the activation application specifying information of which the main unit 10 is notified by the operation unit 20. Accordingly, the process of synchronizing the application (preferential application) to be preferentially activated by the operation unit 20 and the application to be activated by the main unit 10 completes. Thus, according to the embodiment, when power is supplied after power is shut down, the main unit 10 and the operation unit 20 perform the process of activating the applications according to the activation application specifying information on the already synchronized applications, which makes it possible to efficiently performing the process of synchronizing the application to be preferentially activated by the operation unit 20 and the application to be activated by the main unit 10.

FIG. 9 is a diagram illustrating exemplary processing operations performed by the MFP according to the embodiment. Specifically, FIG. 9 illustrates exemplary processing operations performed when the MFP 1 accepts the check notification to check the application being active. Note that the same processing operations as those of the MFP 1 described above with reference to FIG. 5 are denoted with the same reference numbers and descriptions of processing operations overlapping those in FIG. 5 will be omitted properly.

First of all, the processing at steps S1 to S5 is performed. Then, the main unit 10 issues a check notification to check the application being active each time the predetermined period elapses to the main unit 10 and the operation unit 20 (step S31 and step S32).

The main unit 10 checks the application being active (step S33) and, when an application different from that represented by the activation application specifying information on the application to be activated by the main unit 10, which is the information stored in the setting storage unit 112, is active, the main unit 10 refers to the activation application specifying information, specifies the application to be activated by the main unit 10, and performs control to activate the application of the main unit 10 (step S34). When the application same as that represented by the activation application specifying information stored in the setting storage unit 112 is active, no processing is performed and the current state is maintained.

The operation unit 20 checks the application being active (step S35) and, when an application different from that represented by the activation application specifying information on the application to be activated by the operation unit 20, which is the information stored in the activation information storage unit 215, is active, refers to the activation application specifying information, specifies the application to be activated by the operation unit 20, and performs control to activate the application of the operation unit 20 (step S36). When the same application as that according to the activation application specifying information stored in the activation information storage unit 215 is active, no processing is performed and the current state is maintained.

The display control unit 213 of the operation unit 20 causes the display unit 212 to display the screen (UI screen) for accepting an operation on the application activated at step S36 (step S37).

As described above, according to the embodiment, upon accepting the check notification to check the application being active each time the predetermined time elapses, for example, upon accepting a control signal for performing the above-described system resetting process, the main unit 10 and the operation unit 20 checks the applications being active. When an application different from that represented by the activation application specifying information is active, the activation application specifying information is referred to, the applications to be activated by the main unit 10 and the operation unit 20 are specified, and control to activate the applications of the main unit 10 and the operation unit 20 is performed, whereby the process of synchronizing the applications of the main unit 10 and the operation unit 20 with each other is performed. Thus, according to the embodiment, the process of synchronizing the preferential application of the operation unit 20 and the application of the main unit 10 corresponding to the preferential application is performed efficiently.

As described above, according to the embodiment, when the operation state of the MFP 1 changes, the process of synchronizing the application (preferential application) to be preferentially activated by the operation unit 20 and the application to be activated by the main unit 10 is controlled according to the pre-stored activation application specifying information that determines the applications in the already synchronized state, which makes it possible to efficiently perform the process of synchronizing the preferential application of the operation unit 20 with the application of the main unit 10 corresponding to the preferential application.

Furthermore, according to the embodiment, for example, just after the MFP 1 is activated, when the system is to be reset, or when transition to the energy-saving mode is to be performed, the main unit 10 and the operation unit 20 perform control to activate the applications of the main unit 10 and the operation unit 20 according to the activation application specifying information that determines the already-synchronized applications, which makes it possible to perform the process of synchronizing the applications of the main unit 10 and the operation unit 20.

Thus, according to the embodiment, it is possible to efficiently perform the process of synchronizing the application to be preferentially activated by the operation unit 20 and the application to be activated by the main unit 10. In other words, it is possible to achieve a useful effect that the time until the user is able to use the application can be shortened.

According to the above-described embodiment, the main unit 10 and the operation unit 20 run independently of each other on the different operating systems. Alternatively, for example, a mode may be employed where the main unit 10 and the operation unit 20 run on the same operating system.

The software (program) to be executed by the image forming apparatus 1 according to the embodiment may be configured to be recorded and provided in a computer-readable recording medium, such as a floppy (trademark) disc, a compact disk (CD), a compact disc-recordable (CD-R), a compact disc read only memory (CD-ROM), a digital versatile disc (DVD), a SD memory card, or a universal serial bus (USB) memory in a file in an installable or executable form.

Furthermore, the software (program) to be executed by the image forming apparatus 1 according to the embodiment may be configured to be stored in a computer connected to a network, such as the Internet, and provided by being downloaded via the network. Furthermore, the program to be executed by the image forming apparatus 1 according to the embodiment may be provided or distributed via a network, such as the Internet.

The device configuration according to the embodiment in which the main unit 10 and the operation unit 20 are connected to each other is an example only. Needless to say, there are various exemplary system configurations according to the use and purposes.

The software (program) executed by the image forming apparatus 1 according to the embodiment has a module configuration including each functional unit. The CPUs (processors) 11 and 21 serve as the hardware implementing the module configuration and reads the programs from the ROMs 12 and 22 and execute the programs, so that the functional units are loaded into the RAMS 13 and 23 and the functional units are generated in the RAMS 13 and 23. Part of all of the functional units may be implemented with hardware circuits, such as processors that perform arithmetic operations.

For the embodiment, the exemplary case has been described where the image forming apparatus 1 according to the invention is applied to a MFP with at last two of the copy function, the printer function, the scanner function and the FAX function. Alternatively, it may be applied to any image forming apparatus, such as a copier, a printer, a scanner device, or a facsimile device.

According to the embodiment, it is possible to efficiently perform the process of synchronization with the preferential application between the operation unit and the main unit.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
an operation unit, including a display unit configured to display a screen, configured to accept an operation; and
a main unit, including at least a processor and a memory, configured to run according to the operation accepted by the operation unit, each of the operation unit and the main unit including an operating system,
wherein the operation unit is further configured to,
store activation application specifying information that specifies an application to be activated on the operating system of the operation unit in response to the image forming apparatus entering a given state;
notify the main unit of the activation application specifying information;
control activation of the application to be activated by the operation unit, which is the application specified with reference to the activation application specifying information according to a state of the image forming apparatus, and perform control to cause the display unit to display a screen for accepting an operation on the application that is activated by the application control unit, wherein the main unit is further configured to, store the notified activation application specifying information, and control activation of an application to be activated by the main unit, which is the application specified with reference to the activation application specifying information according to the state of the image forming apparatus;

wherein the application to be activated by the operation unit includes correspondence information that associates each application with its corresponding application to be activated by the main unit, wherein the notification by the operation unit refers to the correspondence information included in the application and the activation application, which when issued, specifies information including information specifying the application to be activated by the main unit corresponding to the application to be activated by the operation unit, and wherein the operation unit is further configured to store the activation application specifying information, including the specified application to be activated by the main unit.

2. The image forming apparatus according to claim 1, wherein the main unit is further configured to issue a transition notification to transition from a normal mode to an energy-saving mode that is a mode in which the power consumption is reduced compared to that in the normal mode, and in response to accepting the transition notification, the operation unit is further configured to perform control to activate the application of the operation unit that is specified with reference to the activation application specifying information, and in response to accepting the transition notification, the operation unit is further configured to perform control to activate the application of the main unit that is specified with reference to the activation application specifying information.

3. The image forming apparatus according to claim 1, wherein the main unit is further configured to issue a check notification to check an application being active each time a time period elapses, the operation unit is configured to check the application being active in response to accepting the check notification and, in response to an application different from an application according to the activation application specifying information being active, is configured to perform control to activate the application of the operation unit that is specified according to the activation application specifying information, the operation unit is configured to perform control to cause the display unit to display a screen for accepting an operation on the application that is activated by the operation unit, and the main unit is configured to check the application being active in response to accepting the check notification and, in response to an application different from an application according to the activation application specifying information being active, is configured to perform control to activate the application of the main unit that is specified according to the activation application specifying information.

4. The image forming apparatus according to claim 1, wherein the operation unit is further configured to:

store application correspondence information that associates each application to be activated by the operation unit with its corresponding application to be activated by the main unit; and update the application correspondence information in response to an application to be activated by the operation unit being added or in response to the application to be activated by the operation unit being updated, wherein the notification by the operation unit refers to the application correspondence information and the operation unit is configured to issue the activation application specifying information including information that specifies the application to be activated by the main unit corresponding to the application to be activated by the operation unit, and wherein the main unit is configured to update the activation application specifying information including the specified application to be activated by the main unit and to store the updated activation application specifying information.

5. The image forming apparatus according to claim 4, wherein the operation unit is configured to issue the activation application specifying information in response to the storage of the activation application specifying information or in response to the updating of the activation application specifying information.

6. The image forming apparatus according to claim 1, wherein the activation application specifying information includes a preferential application representing an application to be preferentially displayed on the display unit in response to the image forming apparatus entering a given state, the operation unit is configured to perform control to activate the preferential application that is specified with reference to the activation application specifying information in response to the state of the image forming apparatus being in any one of a state after activation, a state where transition to an energy-saving mode is to be performed, a state where a period has elapsed, a state where the transition notification has been accepted, and a state where the check notification has been accepted, and the main unit is configured to perform control to activate the application of the main unit that is specified with reference to the activation application specifying information corresponding to the preferential application.

7. An image forming system comprising:

an operation unit, including a display unit to display a screen, configured to accept an operation;

a main unit, including at least one processor and at least a memory, configured to run according to the operation accepted by the operation unit, each of the operation unit and the main unit including an operating system;

memory configured to store activation application specifying information that specifies an application to be activated on the operating system of the operation unit in response to the image forming system entering a given state;

the operation unit including at least one processor configured to notify the main unit of the activation application specifying information;

control activation of the application to be activated by the operation unit, which is the application specified with reference to the activation application specifying information according to a state of the image forming system; and perform control to cause the display unit to display a screen for accepting an operation on the application that is activated, and the at least one processor of the main unit being configured to store the notified activation application specifying information; and control activation of an application to be activated by the main unit, which is the application specified with reference to the activation application specifying information according to the state of the image forming system;

wherein the application to be activated by the operation unit includes correspondence information that associates each application with its corresponding application to be activated by the main unit, wherein the notification by the operation unit refers to the correspondence information included in the application and the activation application, which when issued, specifies information including information specifying the application to be activated by the main unit corresponding to the application to be activated by the operation unit, and wherein the operation unit is further configured to store the activation application specifying information, including the specified application to be activated by the main unit.

8. The image forming system according to claim 7, wherein the at least one processor of the main unit is further configured to issue a transition notification to transition from a normal mode to an energy-saving mode that is a mode in which the power consumption is reduced compared to that in the normal mode, and in response to accepting the transition notification, the at least one processor of the operation unit is further configured to perform control to activate the application of the operation unit that is specified with reference to the activation application specifying information, and in response to accepting the transition notification, the at least one processor of the operation unit is further configured to perform control to activate the application of the main unit that is specified with reference to the activation application specifying information.

9. The image forming system according to claim 7, wherein, the at least one processor of the main unit is further configured to issue a check notification to check an application being active each time a time period elapses, the at least one processor of the operation unit is configured to check the application being active in response to accepting the check notification and, in response to an application different from an application according to the activation application specifying information being active, is configured to perform control to activate the application of the operation unit that is specified according to the activation application specifying information, the at least one processor of the operation unit is configured to perform control to cause the display unit to display a screen for accepting an operation on the application that is activated by the operation unit, and the at least one processor of the main unit is configured to check the application being active in response to accepting the check notification and, in response to an application different from an application according to the activation application specifying information being active, is configured to perform control to activate the application of the main unit that is specified according to the activation application specifying information.

10. The image forming system according to claim 7, wherein, the at least one processor of the operation unit is further configured to:

store application correspondence information that associates each application to be activated by the operation unit with its corresponding application to be activated by the main unit; and update the application correspondence information, in response to an application to be activated by the operation unit being added or in response to the application to be activated by the operation unit being updated, wherein the notification by the at least one processor of operation unit refers to the application correspondence information and the operation unit is configured to issue the activation application specifying information including information that specifies the application to be activated by the main unit corresponding to the application to be activated by the operation unit, and wherein the at least one processor of the main unit is configured to update the activation application specifying information including the specified application to be activated by the main unit and to store the updated activation application specifying information.

11. The image forming system according to claim 10, wherein the at least one processor of the operation unit is configured to issue the activation application specifying information in response to the storage of the activation application specifying information or in response to the updating of the activation application specifying information.

12. The image forming system according to claim 7, wherein the activation application specifying information includes a preferential application representing an application to be preferentially displayed on the display unit in response to the image forming apparatus entering a given state, the at least one processor of the operation unit is configured to perform control to activate the preferential application that is specified with reference to the activation application specifying information in response to the state of the image forming apparatus being in any one of a state after activation, a state where transition to an energy-saving mode is to be performed, a state where a period has elapsed, a state where the transition notification has been accepted, and a state where the check notification has been accepted, and the at least one processor of the main unit is configured to perform control to activate the application of the main unit that is specified with reference to the activation application specifying information corresponding to the preferential application.

13. An image forming method performed by an image forming apparatus including an operation unit, including a display unit to display a screen, configured to accept an operation; and a main unit configured to run according to the operation accepted by the operation unit, each of the operation unit and the main unit including an operating system, the image forming method comprising:

storing activation application specifying information to specify an application to be activated on the operating system of the operation unit in response to the image forming apparatus entering a given state;

notifying the main unit of the activation application specifying information;

storing the notified activation application specifying information;

controlling activation of an application to be activated by the operation unit, which is the application specified with reference to the activation application specifying information according to a state of the image forming apparatus, performing control to cause the display unit to display a screen for accepting an operation on the activated application, and controlling activation of an application to be activated by the main unit, which is the application specified with reference to the activation application specifying information according to the state of the image forming apparatus;

wherein the application to be activated by the operation unit includes correspondence information that associates each application with its corresponding application to be activated by the main unit, wherein the notifying of the main unit refers to the correspondence information included in the application and the activation application, which when issued, specifies information including information specifying the application to be activated by the main unit corresponding to the application to be activated by the operation unit, and wherein the activation application specifying information is further stored, including the specified application to be activated by the main unit.

14. The image forming method according to claim 13, further comprising:

issuing a transition notification to transition from a normal mode to an energy-saving mode that is a mode in which the power consumption is reduced compared to that in the normal mode, and performing, in response to accepting the transition notification, control to activate the application of the operation unit that is specified with reference to the activation application specifying information, and performing, in response to accepting the transition notification, control to activate the application of the main unit that is specified with reference to the activation application specifying information.

15. The image forming method according to claim 13, further comprising:

issuing a check notification to check an application being active each time a time period elapses, checking the application being active in response to accepting the check notification, performing, in response to an application different from an application according to the activation application specifying information being active, control to activate the application of the operation unit that is specified according to the activation application specifying information, performing control to cause the display unit to display a screen for accepting an operation on the application that is activated by the operation unit, and checking the application being active in response to accepting the check notification, performing, in response to an application different from an application according to the activation application specifying information being active, control to activate the application of the main unit that is specified according to the activation application specifying information.

16. The image forming method according to claim 13, further comprising:

storing application correspondence information that associates each application to be activated by the operation unit with its corresponding application to be activated by the main unit; and updating the application correspondence information in response to an application to be activated by the operation unit being added or in response to the application to be activated by the operation unit being updated, wherein the notifying of the main unit refers to the application correspondence information and the operation unit issues the activation application specifying information including information that specifies the application to be activated by the main unit corresponding to the application to be activated by the operation unit, and updating, by the main unit, the activation application specifying information including the specified application to be activated by the main unit and storing the updated activation application specifying information.

17. The image forming method according to claim 16, further comprising:

issuing the activation application specifying information in response to the storage of the activation application specifying information or in response to the updating of the activation application specifying information.

18. The image forming method according to claim 13, wherein the activation application specifying information includes a preferential application representing an application to be preferentially displayed on the display unit in response to the image forming apparatus entering a given state, wherein the operation unit performs control to activate the preferential application that is specified with reference to the activation application specifying information in response to the state of the image forming apparatus being in any one of a state after activation, a state where transition to an energy-saving mode is to be performed, a state where a period has elapsed, a state where the transition notification has been accepted, and a state where the check notification has been accepted, and wherein the main unit performs control to activate the application of the main unit that is specified with reference to the activation application specifying information corresponding to the preferential application.

* * * * *